（12）United States Patent
Monaco

(10) Patent No.: US 7,280,030 B1
(45) Date of Patent: Oct. 9, 2007

(54) SYSTEM AND METHOD FOR ADJUSTING ACCESS CONTROL BASED ON HOMELAND SECURITY LEVELS

(75) Inventor: Marc Monaco, Sewell, NJ (US)

(73) Assignee: Sielox, LLC, New York, NY (US)

( * ) Notice: Subject to any disclaimer, the term of this patent is extended or adjusted under 35 U.S.C. 154(b) by 293 days.

(21) Appl. No.: 10/948,901

(22) Filed: Sep. 24, 2004

(51) Int. Cl.
*G05B 19/00* (2006.01)
*G06F 7/00* (2006.01)
*G08B 29/00* (2006.01)
*H04B 1/00* (2006.01)
*H04Q 9/00* (2006.01)

(52) U.S. Cl. .................. 340/5.21; 340/5.61; 340/5.7
(58) Field of Classification Search ............... 340/5.21, 340/5.61–5.65, 5.7, 815.4, 691.6, 522, 552; 713/182, 166, 186; 726/1
See application file for complete search history.

(56) References Cited

U.S. PATENT DOCUMENTS

| | | | |
|---|---|---|---|
| 4,885,788 A * | 12/1989 | Takaragi et al. .............. 705/67 |
| 6,747,564 B1 * | 6/2004 | Mimura et al. .......... 340/825.6 |
| 6,748,544 B1 * | 6/2004 | Challener et al. ............. 726/17 |
| 6,952,163 B2 * | 10/2005 | Huey et al. .................. 340/521 |
| 7,012,503 B2 * | 3/2006 | Nielsen ....................... 340/5.6 |
| 2005/0015624 A1 * | 1/2005 | Ginter et al. ................ 713/201 |

OTHER PUBLICATIONS

"Welcome to Pennsylvania", PAPowerPort, Aug. 27, 2004 (www.state.pa.us).
"Citizen Guidance on the Homeland Security Advisory System", U.S. Department of Homeland Security (Ready.Gov).
"Threats & Protection", U.S. Department of Homeland Security, Aug. 9. 2004 (www.dhs.gov).
"Homeland Security Advisory System-Guidance for Federal Departments and Agencies", U.S. Department of Homeland Security, Aug. 9, 2004 (www.dhs.gov).
"Access Control", Checkpoint Systems, Inc., Jun. 17, 2004 (www.checkpointsystems.com).
"Pinnacle-Covering Your Access Control Security From Start to Finish", Checkpoint Systems, Inc. (www.checkpointsystems.com).

* cited by examiner

*Primary Examiner*—Brian Zimmermann
*Assistant Examiner*—Nam Nguyen
(74) *Attorney, Agent, or Firm*—Caesar, Revise, Bernstein, Cohen & Pokotilow, Ltd.

(57) ABSTRACT

A system and method for automatically regulating access control levels in an access control system based on the threat level as determined by the Department of Homeland Security and/or their corresponding local offices.

14 Claims, 3 Drawing Sheets

| nType | nSource1 | nSource2 | nSource3 | nSource4 | nSource5 | nDestination |
|---|---|---|---|---|---|---|
| 0 (ACL) | 8 | 9 | 11 | 20 | 24 | 3 |
| 1 (TZ) | 19 | 23 | 24 | 29 | 34 | 10 |

Fig. 3

SYSTEM AND METHOD FOR ADJUSTING ACCESS CONTROL BASED ON HOMELAND SECURITY LEVELS

BACKGROUND OF THE INVENTION

1. Field of Invention

This invention relates to generally to access control systems and, more particularly, to a system and method for regulating access control in an access control system based on the threat level as determined by the Department of Homeland Security and/or their corresponding local offices.

2. Description of Related Art

Due to concerns of terrorist attacks and infiltration of buildings and other facilities in recent years, the need for added security has become imperative. Organizations have enhanced security resources by various measures such as re-training existing security personnel, hiring additional security personnel or just hiring security personnel in the first instance where none existed before. Such efforts even include instructing the overall workforce to be alert, aware and knowledgeable about reacting in emergency situations should terrorist acts occur.

In addition, to better alert the public in general, the federal government, via the Department of Homeland Security, has devised the Homeland Security Advisory System (see "www.dhs.gov/dhspublic/display?theme") that comprises distinct alert levels (also referred to as "threat levels") that are issued from time to time. These levels are the following:

1) Green-Low Risk: low risk of terrorist attacks

2) Blue-Guarded Risk: general risk of terrorist attacks

3) Yellow-Elevated Risk: significant risk of terrorist attacks

4) Orange-High Risk: high risk of terrorist attacks

5) Red-Severe Risk: severe risk of terrorist attacks

These levels can be modified by state and local governments to adapt the national alert levels to local existing situations or concerns.

In view of all of the above, there remains a need for an access control system (ACS) that adjusts ACS operation as the Homeland Security Levels are issued, such as restricting access of building/facility portals (e.g., doors, garages, walkways, windows, etc.), times of passage through these portals, computer access in the building/facility, etc.

All references cited herein are incorporated herein by reference in their entireties.

BRIEF SUMMARY OF THE INVENTION

A system for controlling access to a building or facility having portals (e.g., doors, garages, walkways, windows, etc.) that are opened or closed by locks based on identity information detected by identity information detection means (e.g., access card readers, keypads, touch screens, biometric devices such as fingerprint readers, eye-scan (e.g., retina scan) detectors, voice recognition detectors, etc.). The system comprises a server interfaced with the identity information detection means and with locks on the portals and wherein access through the portals is modified by government-issued threat levels (e.g., Department of Homeland Security Levels 1-5).

A method for adjusting access levels in an access control system used in a building or facility having portals (e.g., doors, garages, walkways, windows, etc.) based on government-issued threat levels, said method comprising the steps of: defining access level criteria for portals corresponding to each government-issued threat level; defining time zone criteria for portals corresponding to each government-issued threat level; and selecting access level criteria and time zone criteria based on the current government-issued threat level (e.g., Department of Homeland Security Levels 1-5).

BRIEF DESCRIPTION OF SEVERAL VIEWS OF THE DRAWINGS

The invention will be described in conjunction with the following drawings in which like reference numerals designate like elements and wherein:

FIG. 3 is an access control system application (ACA) table that defines the access level and time zone identifiers for each HSL and wherein one source access level and time zone is copied into the Destination of the ACA to effect the particular access criteria into the ACS based on the corresponding HSL.

DETAILED DESCRIPTION OF THE INVENTION

The present invention, as will be discussed in detail later, is directed to an access control system whose control operations are adjusted based on Homeland Security Levels (HSLs). By way of example only, the preferred embodiment utilizes an already-existing access control system which is sold under the tradename Pinnacle™ by the Assignee of the present application, namely, Checkpoint Systems, Inc. of Thorofare, N.J. However, it should be understood that the present invention is adaptable to any access control system and that any subsequent discussion of the Pinnacle™ access control system does not, in any way, limit the present invention to only that access control system.

Figure 1:
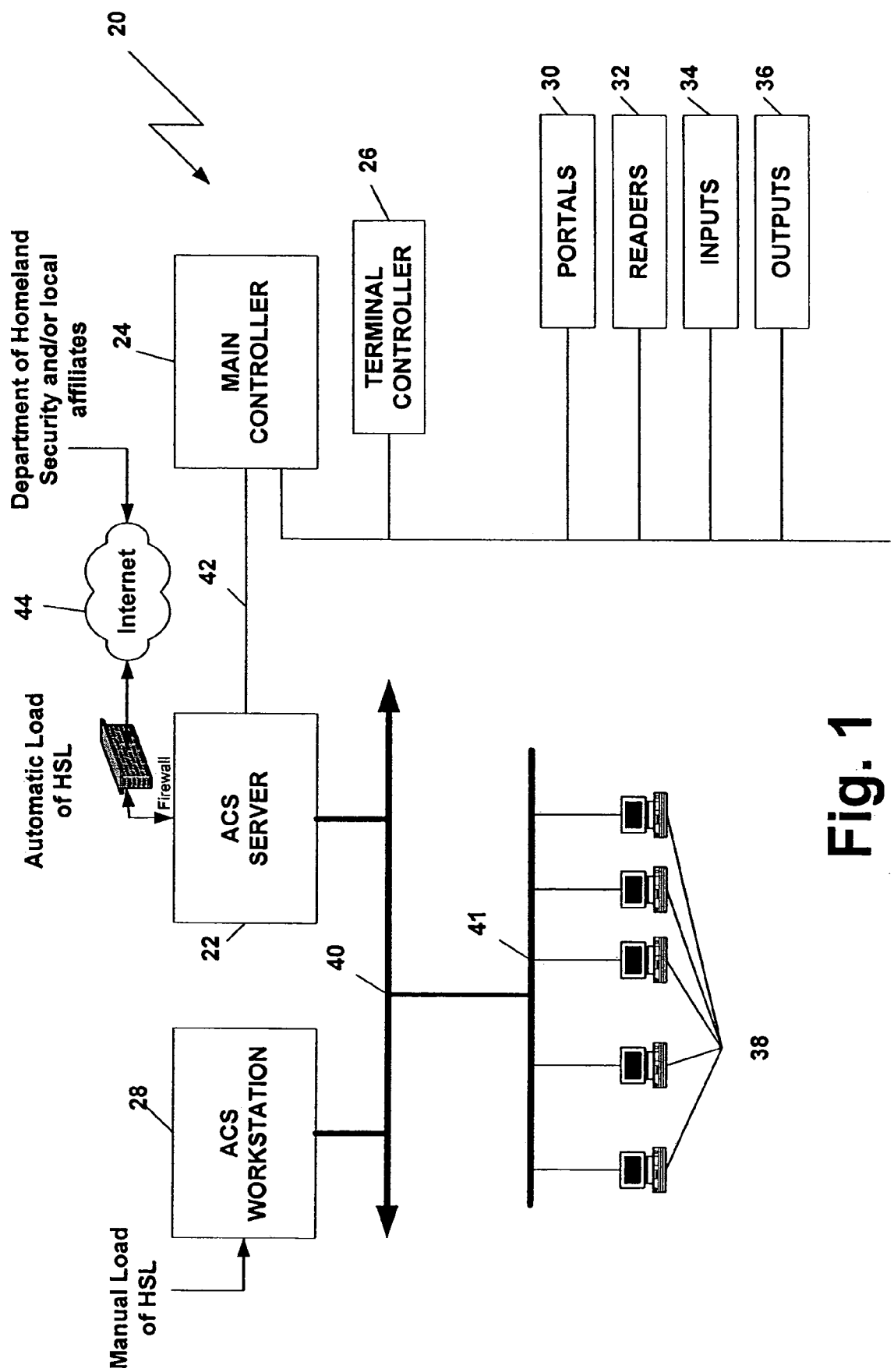
FIG. 1 is a block diagram of an access control system that adjusts access to portals based on the current Homeland Security Level (HSL)

In view of the foregoing, FIG. 1 depicts a block diagram of the present invention 20. The access control system (ACS) 20 basically comprises a server 22, a main controller 24, a terminal controller 26 and a workstation 28. These components operate together to control access to portals 30 (doors, garages, walkways, windows, etc.) based on data from identity information detection means 32 and inputs 34. The identify information detection means 32 may include access card readers, keypads, display screens (including touch screens), biometric devices such as fingerprint reader, eye-scan (e.g., retina scan) detector, voice recognition detector, etc., and includes any device known in the art that permits a person (attempting to gain access through a portal 30) the ability to provide identity information to the ACS 20. The inputs 34 basically comprise switches that the terminal controller 26 monitors to determine if the portal 30 (e.g., door) is open or closed. The outputs 36 comprise drivers for changing the state of the inputs 34, as determined by the terminal controller 26. In addition, the ACS 20 of the present invention also controls computer access to the network 41 and the networked computers 38 themselves. The server 22 and workstation 28 and the computers 38 communicate over a LAN or WAN 40. The server 22 and the main controller 24 communicate used a twisted pair harness 42.

The server 22 comprises a personal computer running an access control application (ACA) and associated database software used to configure the main controller 24 and terminal controller 26 and to display event information as reported by these controllers. The workstation 28 may comprise a PC that runs a graphical user interface (GUI). The main controller 24 is a data multiplexer (e.g., such as an AC-901 16-bit main controller with connectors, part number 946782) and which provides processing capabilities, including buffering events and linking inputs 34 to outputs 36. The terminal controller 26, (e.g., such as an AC-601 16-bit terminal controller with connectors, part number 328812) is an intelligent autonomous device that makes the decisions to grant/deny access, and in particular, receives configuration information (e.g., cards to be granted access during specified periods), decides whether to grant or deny access, and subsequently reports activity back to the server 22, via the main controller 24. In particular, the portals 30 monitor/control the status of the portal (lock/unlock). The readers 32 are input devices that interpret the credentials of the person requesting access. The inputs 34 monitor the state of a switch whereas the outputs 36 control the state of a switch.

The present invention 20 is implemented as a stand-alone application that changes the system configuration to match the threat level as determined by the Department of Homeland Security. The present invention 20 comprises means for automatically modifying Access Levels and Time Zones as the result of a change in the threat level. Modifying Access Levels can change the flow of cardholder activity away from unmanned entrances. Altered Time Zones can be used to more tightly control access to strategic entrances, as in Door Unlock times, Reader/Time Zone associations within Access Levels, etc.

Figure 2:
FIG. 2 is a screen display of the five HSL access levels that comprise predetermined access criteria corresponding to the five HSLs.

In particular, in the ACS 20, an Access Level "General Access" is created and assigned to Cardholders, ALOC and ALIC. Five additional Access Levels are created: "General Access—hls1", "General Access—hls2", etc. (the hls- suffix designates Homeland Security Level (HSL) and is used for sample purposes only and is not required; alternatively, these additional Access Levels could be designated as "General Access-Green", "General Access-Blue", "General Access-Yellow", etc., to more easily associate the particular Access Levels with the corresponding HSLs). The administrator maps "General Access" to each of the five Access Levels: "General Access—hls1", "General Access—hls2", etc. as shown in FIG. 2. When the threat level changes from 3 to 2, the contents of "General Access—hls2" (which comprises its list of Readers and associated Time Zones) is copied into "General Access", replacing its previous contents. In other words, "General Access" is modified to match the configuration of "General Access—hls2". As a result, all Cardholders issued "General Access" are impacted, as are all ALOC and ALIC configured using "General Access".

The same scenario applies to Time Zones (e.g., these include days of the week, Sunday-Saturday, a 24 hour clock, and holiday designations). A destination Time Zone is mapped to 5 sources, one for each threat level. When the threat level is changed, the destination Time Zones are modified by copying the contents of the corresponding sources.

As shown in FIG. 3, a table "Ckpt.Homeland_T" is added to map each of the 5 sources with a destination. The same table is used for Access Levels and Time Zones. Cascade deletes are used to remove entries form Homeland_T when Access Levels and Time Zones are deleted. If one of the sources is deleted, its entry in Homeland_T is replaced with zero (0). For example, the Access Level ACL entry 8 for nSource1 corresponds to a set of access conditions regarding interior doors, exterior doors, garages, employee identities, cardholders, groups, events, etc., that have been predetermined for hls1; correspondingly, Time Zone entry 19 for nSource1 corresponds to predefined time zone definitions for hls1. Thus, should an hls1 level be entered into the ACS 20, the ACL entry 8 and the TZ entry 19 are transferred to the corresponding entries in nDestination. It is the ACL entry and TZ entry in nDestination that are used by the ACA to change the access levels and time zone control of the ACS 20.

Once a source (hls) is selected, should user then interfaces with the identity information detection means 32 (e.g., swipe his/her card through an access card reader, enter data through a keypad/touch screen, or conduct a retina scan, place his/her finger on a fingerprint scanner, sample the person's voice, etc.) this identity information (e.g., name, badge number, PIN (personal identification number or any known equivalent), retina information, voice data, fingerprint data, etc.) is compared against the particular Access Level criteria and Time Zone criteria for that selected source (hls) by the ACA. If the identity data is available among those criteria, access is permitted and the terminal controller 26 commands the drivers for the portal 30 or other output 36 to permit (e.g., open lock) the user access. If, on the other hand, that identity data is not available among those criteria, access is denied.

It should be understood that depending on the type of identity information detection means 32 being used (e.g., access card reader, keypads, proximity readers, display screens (including touch screens), fingerprint scanner, retina scan, voice recognition, etc.) the corresponding identity data (if authorized for that Access Level) in the Access Level criteria are in a form compatible with the particular identity information detection means 32 that has forwarded the particular identity data to the ACA. For example, if a fingerprint scanner is used as an identity information detection means 32, then individuals who are permitted access, depending on the Access Level criteria, have corresponding fingerprint data against which to compare the incoming fingerprint data from the fingerprint scanner. Furthermore, it should be understood that it is within the broadest scope of the present invention 20 to include different kinds of identity information detection means 32 that are coupled to one ACS 20. Thus, the ACS 20 may include fingerprint scanners, access card readers, voice recognition detectors, etc. or any combination thereof.

The ACA is referred to as "ckpHomeland.EXE" and may be coded in Visual Basic, (e.g., using the Pinncale™ SDK). The ACA enables the administrator to adjust the current threat level and initiate the resulting changes to the specified Access Levels and Time Zones. The ACA enables the user to configure selected Access Levels and Time Zones for each of the five (5) threat levels (HSLs). Changes occur by transferring the contents from the source Access Levels or Time Zones to the destination. FIG. 3 illustrates an example See the example included in the Use Case section below.

When the HSL changes, the ACA provides a preview of the pending changes and enables the administrator to selectively confirm or deny each one. Modifications that result from changing the current HSL are sent to the controllers 24 and 26 automatically, without the need for a manual scheduled refresh. The ACA displays a list of Access Levels and Time Zones that were changed. This list can be printed and/or saved to an external text file.

The ACA provides a Refresh option so that Destination Access Levels and Time Zones can be updated to reflect changes in Source Access Levels and Time Zones without having to change the threat level. Changes to Access Levels and Time Zones are logged in an Event Archive. A Customer Report (ckpHomeland.RPT) is provided that lists the selected Access Levels and Time Zones and their variations for each threat level.

The ACA requires a login from a user in an Administrators role. All others are not permitted to run the ACA. Only one instance of the ACA runs on a single PC.

The current HSL can be manually inputted to the ACS 20 through the ACS workstation 28, as shown in FIG. 1. Alternatively, as also shown in FIG. 1, the ACA may comprise an update module that periodically looks on the Internet 44 to see if the HSL level in the vicinity has been changed and then selects the corresponding nsource (hls) as described previously. For example, the update module can periodically check the Department of Homeland Security website www.dhs.gov/dhspublic/, or even the pertinent state website www.state.pa.us (for Pennsylvania, by way of example only), and obtain the current HSL (either or both national and local levels) therefrom.

As mentioned earlier, it is within the broadest scope of the present invention to also include modifying the level of access of computers 38 based on the Homeland Security Levels. For example, all computers 38 in a building or facility that are networked and have network accounts (e.g., Microsoft domain model network) can have access to each computer regulated based on the most current HSL. Thus, as the HSL increases in risk, those personnel (employees, cardholders, groups, etc.) having the proper security clearances are the only personnel having access to the network and even the computer station 38 itself. For example, should a user attempt to boot up a computer and the password entered is not part of the Access Level criteria for the currently selected hls, then access to that computer is denied to that particular user.

As used throughout this Specification, the term "biometric" includes any technology that identifies or verifies individuals based upon an individual's unique physical or behavioral characteristics. Devices employing these technologies match patterns of live individuals in real time against pre-stored records. Examples of biometric technologies are, but are not limited to, those that recognize and authenticate faces, hands, fingers, signatures, irises, voices, fingerprints, etc.

While the invention has been described in detail and with reference to specific examples thereof, it will be apparent to one skilled in the art that various changes and modifications can be made therein without departing from the spirit and scope thereof.

What is claimed is:

1. A system for controlling access to a building or facility having portals that are opened or closed by locks based on identity data detected by identity information detection means, said system comprising:
    a server interfaced with said identity information detection means and with locks on the portals and wherein access through the portals is modified by government-issued threat levels, said server comprising a database containing:
        respective predetermined access level criteria for each of said government-issued threat levels; and
        respective predetermined time zone criteria for each of said government-issued threat levels; and
    wherein said server further comprises an access control application that selects one of said respective predetermined access level criteria and said time zone criteria from said database based on the respective government-issued threat level inputted to said server, said access control application comparing data transmitted by said identity information means against said predetermined access level criteria whenever a user interacts with said identity information detection means at a portal; and
    wherein said access control application commands the portals to either open or remain closed based on comparing said respective predetermined access level criteria and said predetermined time zone criteria selected by said server against said identity data transmitted by said identity information detection means.

2. The system of claim 1 wherein said identity information detection means comprises a card reader.

3. The system of claim 1 wherein said identity information detection means comprises a biometric device.

4. The system of claim 3 wherein said biometric device comprises a fingerprint reader.

5. The system of claim 3 wherein said biometric device comprises an eye-scan device.

6. The system of claim 3 wherein said biometric device comprises a voice recognition device.

7. The system of claim 1 wherein said portals comprises doors.

8. The system of claim 1 wherein said portals comprises garages.

9. The system of claim 1 wherein said building or facility includes a computer network and wherein said computer network is coupled to said server, said system controlling access to said network based on said government-issued threat levels.

10. The system of claim 9 wherein said computer network comprises a plurality of computers coupled thereto and wherein access to each one of said plurality of computers is controlled by said system based on said government-issued threat levels.

11. A method for adjusting access levels in an access control system for a building or facility having portals based on government-issued threat levels, said method comprising the steps of:
    defining access level criteria for portals corresponding to each government-issued threat level;
    defining time zone criteria for portals corresponding to each government-issued threat level;
    selecting access level criteria and time zone criteria based on the current government-issued threat level;
    receiving personnel data from an identity information detection means at at least one portal;
    comparing said personnel data with said selected access level criteria and time zone criteria; and
    allowing or denying access through said portal based on said comparison.

12. A method for adjusting access levels in an access control system for a building or facility having portals based on government-issued threat levels, said method comprising the steps of:
    defining access level criteria for portals corresponding to each government-issued threat level;
    defining time zone criteria for portals corresponding to each government-issued threat level;
    selecting access level criteria and time zone criteria based on the current government-issued threat level;
    providing a network having computers coupled thereto;
    comparing said personal data with said selected access level criteria and time zone criteria; and allowing or denying access to said network based on said comparison.

13. A method for adjusting access levels in a computer network having a plurality of computers coupled thereto based on government-issued threat levels, said method comprising the steps of:
defining access level criteria for the computer network corresponding to each government-issued threat level;
defining time zone criteria for the computer network corresponding to each government-issued threat level;
selecting access level criteria and time zone criteria based on the current government-issued threat level;
receiving personal data from a user of one of said plurality of computers;
comparing said personal data with said selected access level criteria and time zone criteria; and
allowing or denying access to said network by the user based on said comparison.

14. The method of claim 13 wherein said step of allowing or denying access to said network by the user further comprises allowing or denying access to said one of said plurality of computers by the user.

* * * * *